United States Patent
Edwards et al.

(10) Patent No.: US 6,678,237 B1
(45) Date of Patent: Jan. 13, 2004

(54) DUAL LAYER OPTICAL STORAGE MEDIUM HAVING PARTIALLY REFLECTING LAYER COMPRISING AMORPHOUS SELENIUM

(75) Inventors: Jathan D. Edwards, Afton, MN (US); William C. Mitchell, Arden Hills, MN (US); Mark A. Arps, Woodbury, MN (US)

(73) Assignee: Imation Corp., Oakdale, MN (US)

( * ) Notice: Subject to any disclaimer, the term of this patent is extended or adjusted under 35 U.S.C. 154(b) by 1130 days.

(21) Appl. No.: 08/826,111

(22) Filed: Mar. 27, 1997

(51) Int. Cl.⁷ .................................................. G11B 3/20
(52) U.S. Cl. ......................................... 369/286; 369/13
(58) Field of Search ......................... 369/13, 284, 286, 369/288, 283, 275.1; 428/64.1, 64.4; 430/270.12, 270.15, 945

(56) References Cited

U.S. PATENT DOCUMENTS

| | | |
|---|---|---|
| 3,946,367 A | 3/1976 | Wohlmut et al. ........... 340/173 |
| 4,219,704 A | 8/1980 | Russell .................... 179/100.3 |
| 4,385,372 A | 5/1983 | Drexler ....................... 369/109 |
| 4,450,553 A | 5/1984 | Holster et al. ............... 369/275 |
| 4,493,887 A | 1/1985 | Peeters et al. .............. 430/275 |
| 4,735,878 A | 4/1988 | Hamersley et al. ........... 430/11 |
| 4,905,215 A | 2/1990 | Hattori et al. ................. 369/14 |
| 5,093,174 A | 3/1992 | Suzuki et al. ................. 428/64 |
| 5,126,996 A | 6/1992 | Iida et al. .................... 369/283 |
| 5,134,604 A | 7/1992 | Nagashima et al. .......... 369/94 |
| 5,171,392 A | 12/1992 | Iida et al. ................. 156/273.3 |
| 5,202,875 A | 4/1993 | Rosen et al. .................. 369/94 |
| 5,210,548 A * | 5/1993 | Grabowski .................. 346/108 |
| 5,238,722 A | 8/1993 | Yashiro et al. ............. 428/64.4 |
| 5,251,198 A | 10/1993 | Strickler ....................... 369/94 |
| 5,255,262 A | 10/1993 | Best et al. ................. 369/275.1 |
| 5,284,538 A * | 2/1994 | Suzuki et al. ................ 156/154 |
| 5,303,224 A | 4/1994 | Chikuma et al. ......... 369/275.1 |
| 5,303,225 A | 4/1994 | Satoh et al. ............. 369/275.1 |

(List continued on next page.)

FOREIGN PATENT DOCUMENTS

| | | |
|---|---|---|
| EP | 0 517 490 A2 * | 12/1992 |
| EP | 0 520 619 A1 | 12/1992 |
| EP | 0 658 887 A1 | 6/1995 |
| EP | 0 706 178 A2 | 4/1996 |
| EP | 0 745 985 A2 | 12/1996 |
| JP | 62-42343 | 2/1987 |
| JP | 63-145087 | 6/1988 |
| JP | 6-44611 | 2/1994 |
| JP | 6-155921 | 6/1994 |
| JP | 6-187662 | 7/1994 |

OTHER PUBLICATIONS

"IBM Scientists Demonstrate Multilevel Optical Disks; Could Increase Optical Data Capacities 10–Fold or More," IBM Press Release, May 12, 1994.

"New I.B.M. Laser Method Stacks Data on Disks," *N.Y. Times*, May 13, 1994.

Publication entitled "Double your capacity with DVD," by Dubs et al., Sep. 15, 1995.

Primary Examiner—Glenton B. Burgess
Assistant Examiner—T. Kupstas
(74) Attorney, Agent, or Firm—Eric D. Levinson

(57) ABSTRACT

A multi-layer optical storage medium includes a transparent substrate, a partially reflective layer, a transparent spacer, and a highly reflective layer. One pattern of data pits is provided on the substrate, adjacent the partially reflective layer, and another pattern of pits is provided on the spacer layer, adjacent the highly reflective layer. The partially reflective layer may be made of amorphous selenium (a-Se) and preferably has an index of refraction having a real component, n, greater than 2.8 and an imaginary component, K, less than 0.01. The invention also includes the optical data storage systems compatible with such media.

30 Claims, 5 Drawing Sheets

U.S. PATENT DOCUMENTS

| | | | |
|---|---|---|---|
| 5,348,783 A | * 9/1994 | Ohno et al. | 428/64 |
| 5,373,499 A | * 12/1994 | Imaino et al. | 369/275.4 |
| 5,475,213 A | * 12/1995 | Fujii et al. | 250/214 |
| 5,492,783 A | * 2/1996 | Utsumi et al. | 430/38 |
| 5,540,966 A | * 7/1996 | Hintz | 428/64.1 |
| 5,587,987 A | * 12/1996 | Okabe | 369/126 |
| 5,640,382 A | 6/1997 | Florczak et al. | 369/275.1 |
| 5,721,042 A | * 2/1998 | Iijima et al. | 428/195 |

* cited by examiner

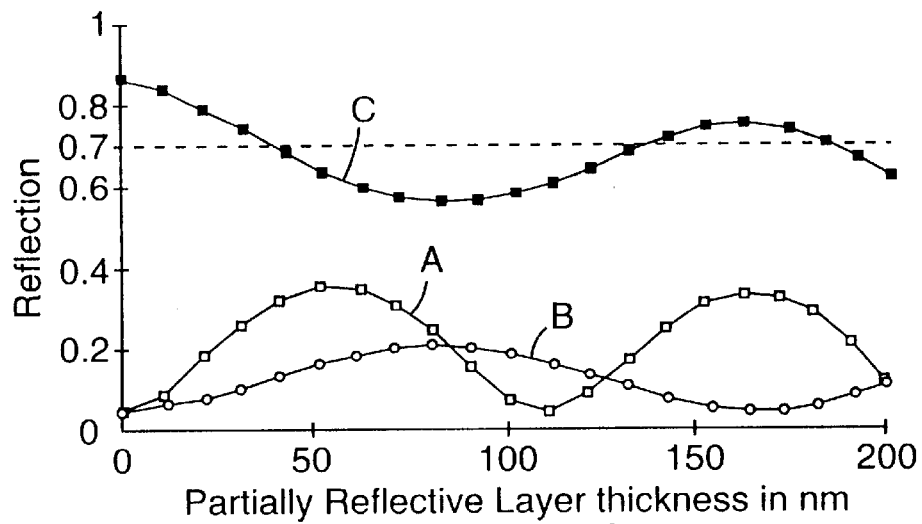
Fig. 6A K=0.02
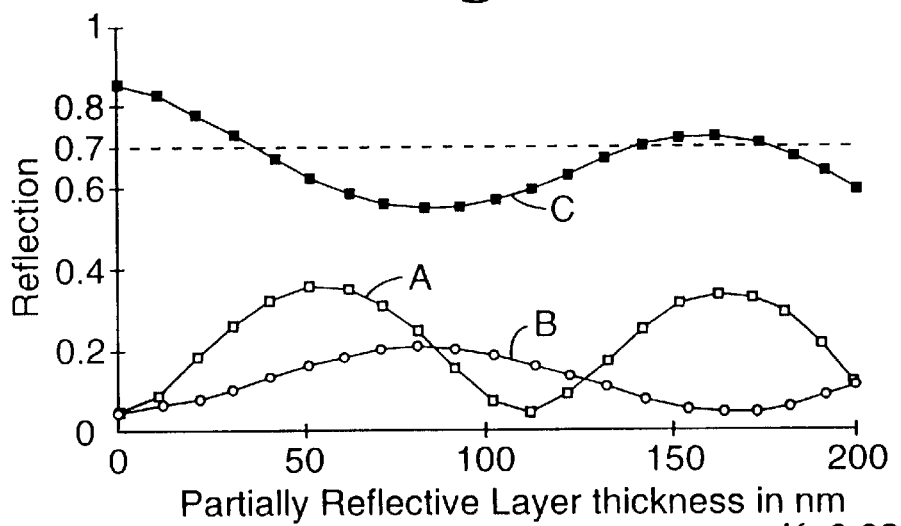
Fig. 6B K=0.03
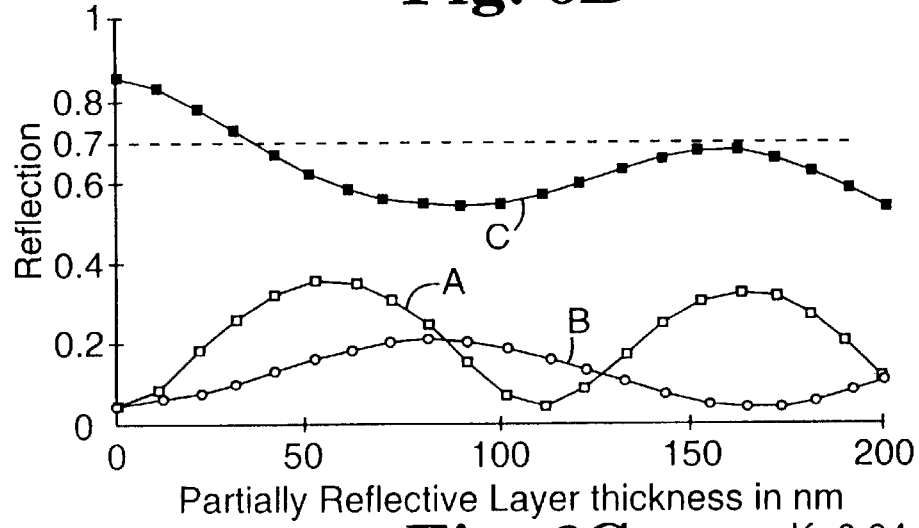
Fig. 6C K=0.04

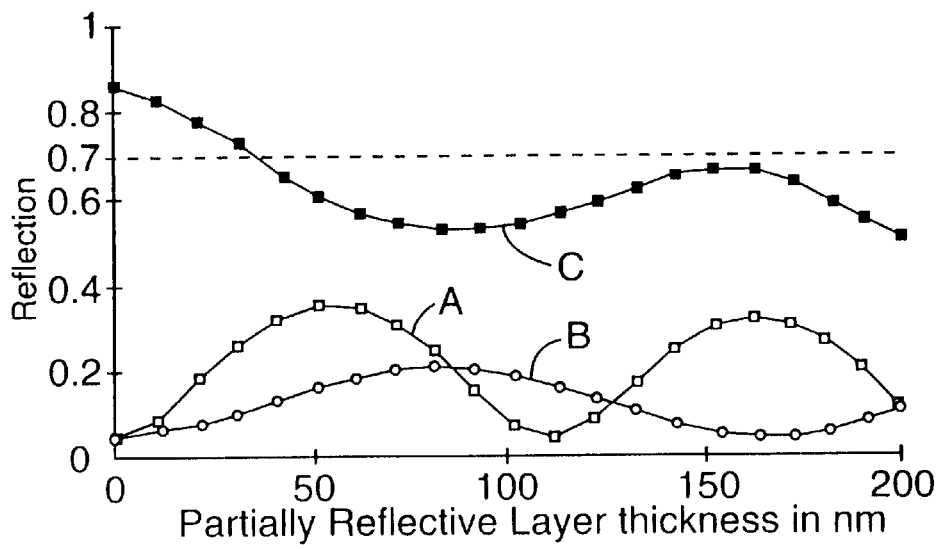
Fig. 6D K=0.05
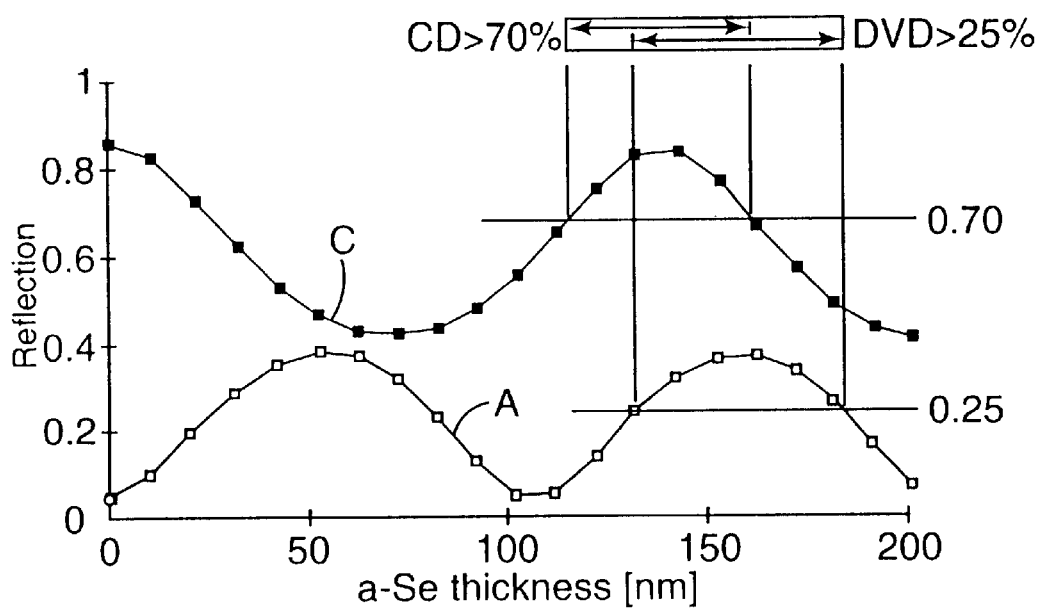
Fig. 7

DUAL LAYER OPTICAL STORAGE MEDIUM HAVING PARTIALLY REFLECTING LAYER COMPRISING AMORPHOUS SELENIUM

FIELD OF THE INVENTION

The present invention relates generally to the field of optical media, and more specifically to the area of optical media which employ two or more information storage layers.

BACKGROUND OF THE INVENTION

There is a seemingly never-ending demand in the field of data storage for media having increased storage capacity and performance. In the field of pre-recorded optical discs, such as compact discs and video discs, increased storage capacity is usually achieved by increasing the storage density per unit area of the disc. However, the maximum data storage density achievable in an optical recording system is limited by the smallest feature that the optical system can resolve. For conventional far-field imaging systems, the smallest resolvable feature size is limited by diffraction effects to approximately the wavelength of the available light source, usually a solid state laser diode. Thus, one method of increasing disc storage capacity is to decrease the wavelength of the laser diode. However, while the wavelengths available from laser diodes have been steadily decreasing, the decreases have not been dramatic due to limitations in solid state technology and materials.

A number of other techniques for increasing storage capacity of optical recording systems have been proposed. These include: (1) higher efficiency data coding schemes, e.g., pulse-width modulation; (2) optical and/or magnetic super-resolution; (3) zoned recording at constant angular velocity; (4) advanced data channel detection methods, such as partial response/maximum likelihood detection, and (5) recording on both the grooves and land areas of the disc.

While the preceding methods for increasing storage capacity all rely upon increasing the storage density per unit area of the disc, an alternative method for increasing the capacity of an optical disc is to employ additional storage layers on the disc which can be independently recorded or reproduced. Thus, the approach in this case is to increase the addressable area of the disc. This approach is attractive because it has the potential to substantially increase media storage capacity with only a modest increase in media and recording system complexity.

If multiple storage layers, e.g., 2, are to be read and/or written by optical beam(s) provided on one side of the disc, then one of the storage layers of the disc must be reflective enough so that it may be read and/or written by the optical beam(s), but transparent enough so that the beam(s) may penetrate the first storage layer and pass on to a second storage layer. However, such a disc has proved to be difficult to construct.

SUMMARY OF THE INVENTION

Accordingly, the present invention is directed to an optical storage medium having a partially reflective layer and a highly reflective layer, whereby data/servo information/format information may be stored on two different layers of the medium. In one embodiment, the medium includes an ordered stack of a transparent substrate, a partially reflective layer, a transparent spacer layer, and a highly reflective layer. The substrate has a pattern of pits in one of its major surfaces. The partially reflective layer may be adjacent the pit pattern side of the substrate. The partially reflective layer comprises amorphous selenium (a-Se). The partially reflective layer may also consist essentially of a-Se, which may be deposited in a variety of manners, including radio frequency (RF) sputtering, such as RF magnetron sputtering.

Another embodiment of the present invention includes a dual layer pre-recorded optical storage disc, comprising, in order, a transparent substrate, a partially reflective layer, a transparent spacer layer, and a highly reflective layer. A first data pit pattern is provided on one side of the disc. The partially reflective layer is adjacent the first pit pattern and has an index of refraction having a real component, n, and an imaginary component, K, wherein n>2.6 and K<0.035 when measured at 650 nm. A second data pit pattern is provided between the transparent spacer layer and the highly reflective layer. The imaginary component, K, of the refractive index is preferably less than 0.01, and more preferably less than 0.003. The real component, n, of the refractive index is preferably greater than 2.8, and more preferably greater than 3.0. The thickness of the partially reflective layer is preferably the same as those discussed above for the partially reflective layer comprising a-Se.

The embodiments of the inventive optical storage media described above each have two aspects. In one aspect, the medium is designed to carry two or more layers of data/servo/format information which may be read by a drive capable of focusing on each of the two or more information layers. In this aspect, an optical storage system for use with the media would include the media as described above, a focused laser beam positioned to enter the medium through the substrate, means for adjusting the focal position of the laser beam, whereby the beam may be focused on either the partially reflective layer or the highly reflective layer, and a photodetector to detect the reflected laser beam exiting the medium. In this aspect, the preferred thickness for the partially reflecting layer is within the range from about 38 to 69 nm, more preferably 42 to 64 nm.

In the second aspect of the present invention, the optical storage medium is a disc which is designed for use with two different drives. The entire disc has a nominal thickness of 1.2 mm so that the pit pattern in the highly reflective layer may be read by a CD-ROM (compact disc-read only memory) drive having a 780 nm laser. The disc also has a substrate having a nominal thickness of about 0.6 mm, so that the pit pattern in the partially reflective layer may be read by a DVD-ROM (digital versatile disc) drive having a 650 nm laser. This would allow a pre-recorded disc seller to sell one disc that could be read by a consumer owning either a CD-ROM or DVD-ROM drive. (Of course, the CD-ROM version of the information would be expected to be less elaborate since the CD-ROM format does not allow for the same storage capacity as the DVD-ROM format.)

In this second aspect, the partially reflective layer preferably has a thickness in the range from about 130 to 160 nm, more preferably 140 to 160 nm. The reflectivity, $R_1$, of the highly reflective layer is preferably greater than 0.7 for 780 nm light, and the reflectivity, $R_2$, of the partially reflective layer is preferably between 0.2 and 0.4 for 650 nm light.

BRIEF DESCRIPTION OF THE DRAWINGS

FIGS. 6A–6D are computer-generated graphs simulating reflectivity as a function of thickness for an imaginary component (K) of the index of refraction ranging from 0.02 to 0.05, respectively, for wavelengths of 650 and 780 nm.

FIG. 7 is a computer-generated graph simulating reflectivity of the partially and highly reflective layer at 650 and 780 nm, respectively, as a function of amorphous selenium thickness.

DETAILED DESCRIPTION

Figure 1:
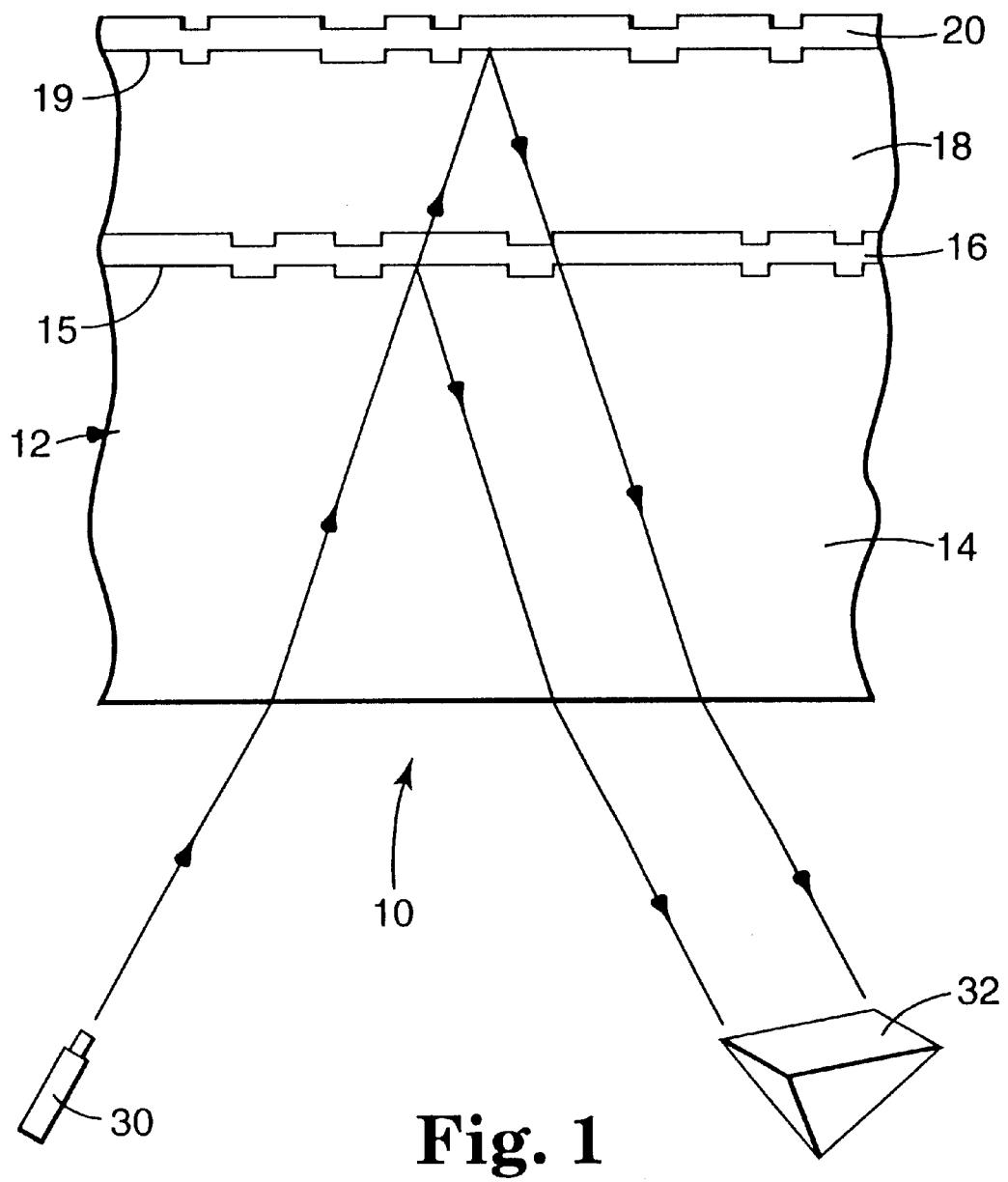
FIG. 1 shows an optical data storage system according to one embodiment of the present invention.

An optical data storage system 10 according to the present invention is shown in FIG. 1. Optical storage medium 12 comprises a transparent substrate 14, a partially reflective thin film layer 16 on a data pit pattern 15, a transparent spacer layer 18 and a highly reflective thin film layer 20 on or adjacent to a second pit pattern 19. An optional protective layer may be provided over highly reflective layer 20. As used herein, "pit pattern" means any pattern of pits or grooves that is capable of storing information, be it data, servo or tracking information, format information, etc. An optical laser 30 emits an optical beam toward medium 12, as shown in FIG. 1. Light from the optical beam which is reflected by either thin film layer 16 or 20 is sensed by detector 32, which senses modulations in light intensity based on the presence or absence of a pit in a particular spot on the thin film layers. Optionally, a double-sided dual layer disc could be formed by bonding two disc-shaped media 12 back-to-back so that the highly reflective layer 20 of each media was separated by an adhesive layer.

The capability for independently reading either the first or second pit pattern 15 or 19 is based on the comparatively limited focal depth characteristic of typical optical disc readout systems. The lenses employed in typical optical recorders/players to form a diffraction limited laser radiation spot on the media storage layer have moderately large (0.4 to 0.6) numerical apertures to improve resolution and increase storage density. Such lenses exhibit focal depths (i.e., the range of focus variation over which the focused spot size remains approximately diffraction limited) of about 2 $\mu$m; for large focus variations the size of the illuminated spot grows rapidly. Consequently, if partially reflective thin film layer 16 exhibits adequate transmission and the distance separating the two data pit patterns 15 and 19 is large relative to the optical system focal depth, it is possible to focus laser 30 on either data pit pattern with acceptably low "cross-talk" from the other data pit pattern. Thus, although the light from laser 30 will be reflected back toward detector 32 by both layers 16 and 20, only the layer upon which the laser is focused will strongly modulate the reflected light intensity, thereby enabling data readout.

The data pit patterns 15 and 19 on medium 10 can be reproduced most easily by first focusing on one of the reflective layers 16 or 20, and then reproducing the data on that entire layer before switching focal position to focus on the other reflective layer. In the alternative, it may be desirable to switch focus position one or more times before completely reproducing the data contained in one of data pit patterns 15 and 19. In either case, use of two data pit patterns separated by transparent layer 18 effectively doubles the data storage capacity of optical recording medium 10.

Transparent substrate 14 may be a polymeric material suitable for optical disc substrates which supportsmolding of data pit pattern 15 with sufficient fidelity, such as polycarbonate or amorphous polyolefin. Alternatively it is possible to use a flat substrate of, for example, glass or polymethylmethacrylate, and form data pit pattern 15 by means of photopolymer replication, as will be described for the formation of data pit pattern 19.

Transparent spacer layer 18 may be a polymer, such as a photocurable polymer, which has a complex refractive index with a real component, n, ranging from about 1.45 to 1.6 and an imaginary component, K, of less than $10^{-4}$ and more preferably less than $10^{-5}$. Transparent spacer layer 18 should be thick enough to allow laser 30 to focus on either of data pit patterns 15 and 19 with a minimum of cross-talk. This translates into a thickness that is preferably within the range of from about 5 to 100 $\mu$m, and more preferably from about 30 to 50 $\mu$m.

Highly reflective layer 20 may be a metallic layer which exhibits high reflectivity at the laser wavelength used to reproduce the data. Currently available laser diode sources radiate at wavelengths ranging from about 600 to 850 nm. Aluminum, gold, silver, copper and their alloys can exhibit suitably high reflectivity in this wavelength range. Highly reflective layer 20 preferably has a reflectance of at least 70%, and more preferably at least 80% and higher, e.g., 85% or 95%.

In order to minimize the complexity and cost of optical data storage system 10, it is desirable that the average readout signal levels from each of the data pit patterns 15 and 19 be approximately equal. Thus, the apparent reflectivity's from layers 16 and 20, as seen by detector 32, should also be approximately equal.

As used herein, the term "apparent reflectivity" refers to the fraction of optical power incident upon transparent substrate 14 which, when focused to a spot on a flat region of either layer 16 or 20, could, in principle, be sensed by a photodetector in an optical readout device. It is assumed that the readout device comprises a laser, an appropriately designed optical path, and a photodetector. It is further assumed that the optical element in the optical path which is in closest proximity to transparent substrate 14 is a high (>0.4) numerical aperture objective lens. As used herein, the terms "internal surface reflectivity" or "internal interface reflectivity" refer to the fraction of optical power incident upon an interface within the media structure (e.g., the interface between transparent substrate 14 and partially reflective layer 16 or the interface between spacer layer 18 and highly reflecting layer 20) which is reflected.

In order to estimate the necessary reflectivity from partially reflective layer 16, we assume that highly reflective layer 20 reflects about 85%–95% of the light incident on the internal interface between spacer layer 18 and highly reflective layer 20. It is further assumed that the refractive index real component, n, of spacer layer 18 is 1.5, that substrate 14 is polycarbonate with a refractive index real component, n, of 1.57, and that reflections at the air-substrate interface do not contribute to the readout signal. If we further assume that partially reflective layer 16 is an ideal material which exhibits essentially no absorption (unlike previously used materials), it can be shown that a reflectivity of about 0.35, as observed at the internal interface between substrate 14 and the partilly reflective layer will yield a balance in the apparent reflectivity's from layers 16 and 20.

Figure 2:
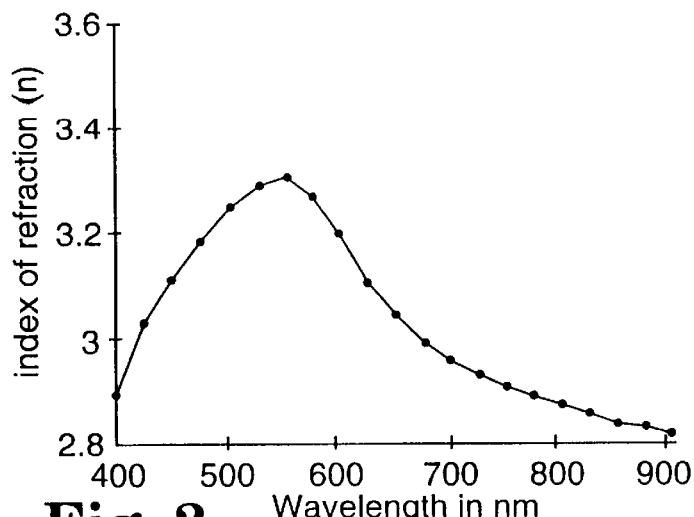
FIG. 2 is a graph of the real component (n) of the index of refraction of a 140 nm thick sample of amorphous selenium as a function of wavelength.

We have discovered that an excellent material for partially reflective layer 16 is amorphous selenium (a-Se). As shown in FIG. 2, the refractive index of a-Se has a high real component (n) over a range of wavelengths (λ) from 400 to 900 nm. A high real component n is required so that partially reflecting layer 16 has greater than 25% reflectivity at the wavelength of interest, e.g., 650 nm. As shown in FIG. 2, for 400 nm<λ<750 nm, n>2.9; for 430 nm<λ<670 nm, n>3.0; for 460 nm<λ<625 nm, n>3.1; for 490 nm<λ<590 nm, n>3.2; and for λ≈550 nm, n≈3.3.

Figure 3:
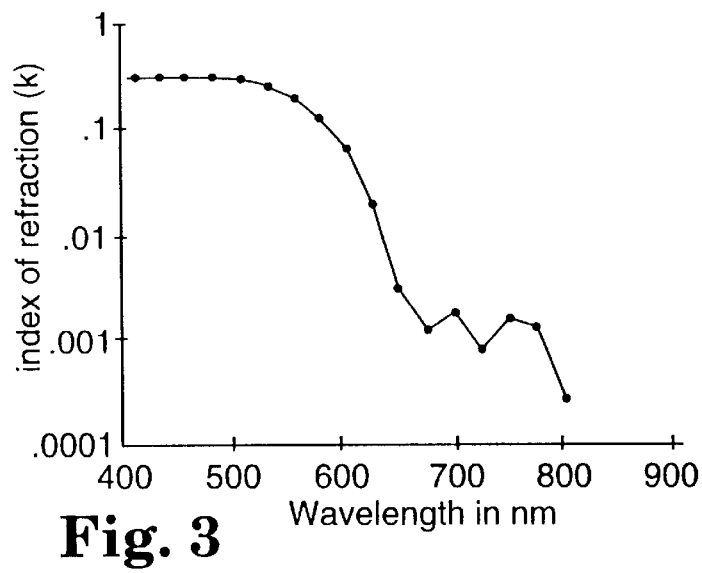
FIG. 3 is a graph of the imaginary component (K) of the index of refraction of a 140 nm thick sample of amorphous selenium as a function of wavelength.

As shown, in FIG. 3, the refractive index of a-Se also has a very low imaginary component (K) over a range of wavelengths from 600 to 800 nm. A low K is necessary to allow the double transmission of light through partially reflective layer 16 without significant loss to enable readout of highly reflective layer 20. As shown in FIG. 3, for λ>600 nm, K<0.1; for λ>625 nm, K<0.035; for λ>640 nm, K<0.01; for λ>650 nm, K<0.005, and for, λ>700 nm (including, e.g., at 780 nm), K<0.003. The combination of high real component (n) and low imaginary component (K) make a-Se an ideal material for partially reflective layer 16.

The a-Se films analyzed in FIGS. 2 and 3 were prepared by radio frequency (RF) magnetron sputtering. The base pressure of the vacuum system prior to sputtering was $5\times10^{-8}$ Torr. The sputtering gas was argon (Ar) at a sputtering pressure of 2 mTorr. The distance between the source and substrate was 8 cm. The forward sputter power was set to 15 watts and the bias potential was −50 volts. The substrate was flat glass. We have also used RF magnetron sputtering to deposit a-Se on polycarbonate substrates under similar conditions.

Figure 4:
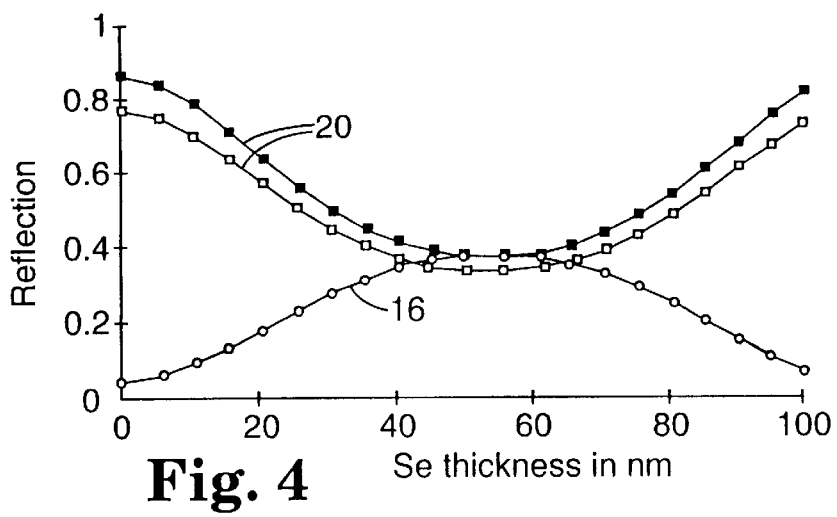
FIG. 4 is a computer-generated graph simulating reflectivities from the two reflective layers as a function of amorphous selenium thickness measured at a wavelength of 650 nm.

It is highly desirable that partially reflective layer 16 exhibit a reflectivity that is relatively constant over a range of thicknesses, thereby making control of film thickness and uniformity during manufacture less difficult. In addition to having a partially reflective layer for which reflectance changes only slowly with thickness variations, it is also desirable that the apparent reflectivities from layers 16 and 20 be approximately equal, and it is most desirable that both characteristics occur over the same range of partially reflective layer thicknesses. Stated differently, it is most desirable to have a media construction for which the apparent reflectivities from layers 16 and 20 are both substantially equal and insensitive to layer 16 thickness variations. This situation is depicted schematically in a computer-generated graph based on optical modeling shown in FIG. 4. The reflectivities for various thicknesses of a-Se (layer 16) and the corresponding reflectivities for the highly reflective layer (layer 20) are shown. The modeling was performed for two cases: (1) using a highly reflective layer 20 having a reflectivity at 650 nm of 95% (e.g., silver) (shown as filled squares in FIG. 4), and (2) using a highly reflective layer 20 having a reflectivity at 650 nm of 85% (e.g., AlCr) (shown as open squares in FIG. 4). For the 95% case (filled squares), the apparent reflectivities at 650 nm from layers 16 and 20 differ from.one another by less than 0.04 for partially reflective layer thicknesses ranging from 42 to 64 nm, with a mean value for R of 0.37±0.02. For the 85% case (open squares), the apparent reflectivities varied by less than 0.04 for partially reflective layer thicknesses ranging from 38 to 69 nm, with a mean value for R of 0.35±0.02. In an optical drive that is electronic noise limited, the high values of R relate to higher optical modulation (signal) and thus a higher signal-to-noise ratio in the detected data pattern.

Figure 5:
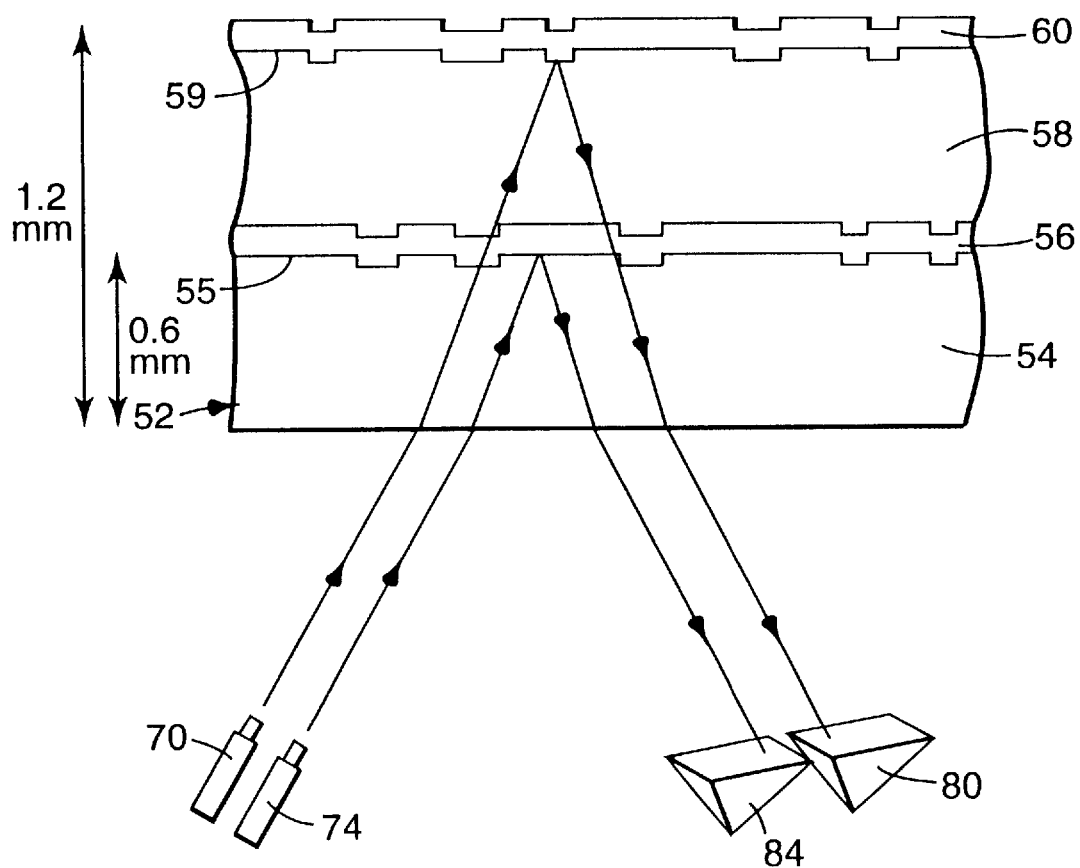
FIG. 5 shows an optical data storage disc adapted for use in two different data storage systems.

The present invention also includes an optical storage system according to another aspect of the invention, as shown in FIG. 5. Disc-shaped optical storage medium 52 comprises a disc-shaped transparent substrate 54, a partially reflective thin film layer 56 on a first data pit pattern 55, a transparent spacer layer 58, and a highly reflective thin filmlayer 60 on a second data pit pattern 59. The layers 54–60 are identical to layers 14–20, respectively, in FIG. 1, except as discussed below.

In a preferred version of this system, substrate 54 has a nominal thickness of about 0.6 mm and the entire disc 52 has a nominal thickness of 1.2 mm. Disc 52 is designed for use in two different data storage systems. One system (a "first" system) uses a laser 70 having a relatively long wavelength. (e.g., λ=780 nm). In this system, the beam from laser 70 passes through substrate 54, partially reflective layer 56 and spacer layer 58, and is focused on second data pit pattern 59. The beam from laser 70 is reflected by highly reflective layer 60 and passes back through spacer layer 58, partially reflective layer 56, and substrate 54, and is sensed by detector 80, which sensor modulations in light intensity based on the presence or absence of a pit on a particular spot on second pit pattern 59. It should be understood that typically laser 70 and detector 80 are part of the same disc drive and thus detector 80 is designed to work with laser 70.

Another system (a "second" system), in which disc 52 could be inserted is characterized by a laser 74 having a relatively short wavelength (e.g., 650 nm). In this system, the beam from laser 74 passes through substrate 54 and is focused on the first data pit pattern 55. The beam from laser 74 is reflected by partially reflective layer 56 and passes back through substrate 54 and is sensed by a detector 84. It should be understood that typically:laser 74 and detector 84 are part of the same disc drive and thus detector 84 is designed to work with laser 74.

A disc such as disc 52 would be desirable for the following reason. One disc 52 could have two densities of information layers (patterns 55 and 59) on it. Second pit pattern 59 could have a first format, such as a low (or medium) density format like that used for compact disc read-only-memory (CD-ROM). Disc 52 could have a thickness of 1.2 mm (consistent with the CD-ROM specification) and second pit pattern 59, located adjacent highly reflective layer 60, could be read by a 780 nm laser (consistent with the CD-ROM specification).

The same disc 52 could also have a second information layer on it (pattern 55) but recorded at a different format density. First pit pattern 55 could have a second format, such as a high density format like that used for DVD-ROM (digital versatile disc). Substrate 54 could have a thickness of 0.6 mm (consistent with the DVD-ROM specification) and first pit pattern 55, located adjacent partially reflective layer 56, could be read using a 650 nm laser (consistent with the DVD-ROM specification).

Thus, one disc 52 could carry two versions of the same software—a shorter, simpler version in second pit pattern 59 for reading by a CD-ROM drive and a longer, more elaborate version in first pit pattern 55 for reading by a DVD-ROM drive. Thus, a software developer could sell a single disc which could be bought by anyone who had either a CD-ROM or a DVD-ROM drive. This could be of tremendous benefit as the pre-recorded disc industry begins to transition from CD-ROM drives to DVD-ROM drives.

However, recognizing the benefits of such a disc is not the same as designing one. Following the DVD-ROM reflectivity target of 24–33%, partially reflective layer 56 must have n>2.6 at 650 nm. Second, the K of the reflective layer 56 at 780 nm must be small enough to allow the 780 nm beam to travel through the layer twice while still meeting the CD-ROM specification of 70% reflectivity. Applicants have discovered that a-Se meets these criteria.

The desired physical properties and thickness of such a partially reflective layer can be derived as follows. A partially reflective layer (56) is interposed between a 0.6 mm polycarbonate substrate (54) with n=1.57 and K=0 and a low index dielectric or polymer film layer (58) with n=1.5 and K=0. In this construction, the optimal partially reflective layer would simultaneously maximize reflection for a first wavelength ($\lambda_1$) and maximize transmission for a second wavelength ($\lambda_2$). Reflective maxima for reflectance at $\lambda_1$ occur when the partially reflective layer has an optical thickness, T, such that:

$$T=(x/4)(\lambda_1/n_{\lambda 1}) \text{ for } x=1, 3, 5, \ldots \quad (I)$$

where $n_{\lambda 1}$ is the real component of the index of refraction of the partially reflective layer at $\lambda_1$. For x=1, the equation becomes $T=\lambda_1/4n_{\lambda 1}$. The actual thickness of the partially reflective layer is preferably within ±20%, more preferably within ±10% of the calculated value of T. Similarly, maxima for the transmissions of $\lambda_2$ occur at:

$$T=(y/2)(\lambda_2/n_{\lambda 2}) \text{ for } y=1, 2, 3, \ldots \quad (II)$$

The maximum signal for both layers occurs when the thickness is the simultaneous solution of equations I and II above. For $\lambda_1$=650 nm and $\lambda_2$=780 nm, the first solution to equations I & II occurs when $$T=(3/4)(\lambda_1/n_{\lambda 1})=\tfrac{1}{2}\lambda_2/n_{\lambda 2}$$

or $$T=(3/4)(650 \text{ nm})/n_{650}=\tfrac{1}{2}(780 \text{ nm})/n_{780}$$

(III) $\Rightarrow n_{780}/n_{650} = 0.80$ and a thickness of ~160 nm for $n_{650} = 3.0$.

The actual thickness of the partially reflective layer should be within ±20%, more preferably within ±10% of the calculated value of T. FIGS. 6A–D show calculated values for reflectance from partially reflective layer 56, $R_{56}$, at 650 nm (shown as line A) and 780 nm (shown as line B) as well as the reflected amplitude (=$R_{60} \cdot T_{56}^2$, where $T_{56}$ is the transmission of the partially reflective layer) from the highly reflective layer 60, $R_{60}$, at 780 nm (shown as line C), with the following assumptions:

$n_{650}=3.0$ $n_{780}=2.4$ $K_{650}=K_{780}=0.02, 0.03, 0.04, 0.05$ $(n_{780}/n_{650}=0.80)$ $R_{60}=95\%$ (e.g., Ag).

Thus, according to these assumptions, the theoretical optical stack may be tuned to thicknesses~160 nm which maximize both $R_{60}$ at 780 nm (CD-ROM reflectivity) and $R_{56}$ at 650 nm DVD-ROM reflectivity). The graphs also indicate that K at 780 nm must be less than about 0.035 to meet the CD-ROM specification ($R_{60}$ at 780 nm>0.70).

Applicants have discovered that a material that comes close to meeting the requirements for n, K, and the ratio $n_{780}$:$n_{650}$=0.8 is a-Se.

As shown in FIG. 2, n for a-Se at 650 nm is greater than the requisite 2.6 (in fact it is greater than 3.0). And as shown in FIG. 3, K for a-Se at 780 nm is less than the requisite 0.035 (in fact it is less than 0.01 and even less than about 0.003). In fact the K of a-Se at 780 nm may be as low as or lower than about 0.001.

However, $n_{780}$:$n_{650}$ for a-Se is 0.95 instead of 0.80. This means that the thicknesses of the a-Se partially reflective layer 56 for maximal reflectivities for CD-ROM (780 nm) and DVD-ROM (650 nm) are not coincident. Thus, the range of useful a-Se partially reflective layer thicknesses is bounded by the overlap of the bands where the CD-ROM specification is met ($R_{60}$ at 780 nm>70%) and where the DVD-ROM specification is met ($R_{56}$ at 650 nm>25%). This overlap is shown in the graph of FIG. 7, with $R_{56}$ at 650 nm being represented by line A and $R_{60}$ at 780 nm being represented by line C.

As shown in FIG. 7, the overlap occurs for thicknesses of a-Se between about 130 to 160 nm. It should also be noted that the a-Se also meets the more stringent requirements of $R_{56}$ at 650 nm>35% within the narrower sub-range of 140 to 160 nm.

The characteristics of a-Se have been well documented due to its importance in the field of xerography. See *Electrophotography* by R. M. Schaffert, Focal Press: London, 5th Edition 1980. It has excellent photoconductive and dielectric properties which are typically modified by adding small amounts of chlorine (Cl) and/or arsenic (As). Amorphous selenium is typically deposited via vacuum evaporation but can (to improve manufacturability) be deposited using other deposition techniques, such as sputtering.

Those skilled in the art will appreciate that media 12 and 52 of the present invention are not restricted to pre-recorded media. For example, second data pit patterns 19 and 59 could be replaced with grooved or pitted patterns which provide tracking information to the drive. If a highly reflective, recordable material were used for highly reflective thin film layers 20 and 60, media 12 and 52, respectively, could contain pre-recorded information in first data pit pattern 15 and 55 while allowing data to be recorded by the user into layers 20 and 60. Thus, in this case, media 12 and 52 would each have one layer of pre-recorded data and one layer of user recordable information.

We claim:

1. An optical storage medium for storing information in at least two separate layers, the medium comprising, in order:
   a transparent substrate having a pattern of pits in one major surface thereof;
   a partially reflective layer, adjacent the substrate, comprising amorphous selenium;
   a transparent spacer layer; and
   a highly reflective layer;
   wherein the medium is designed for use with a focused laser beam having a wavelength $\lambda$ positioned to enter the medium through the substrate, wherein the beam may be adjusted to be focused on each of the partially reflective layer and the highly reflective layer, and further wherein the partially reflective layer has a thickness within ±10% $\lambda/4n_\lambda$, where the partially reflective layer has an index of refraction having a real component (n) having a value measured at $\lambda$ of $n_\lambda$.

2. The medium of claim 1, wherein the partially reflective layer has a thickness within the range from about 38 to 69 nm.

3. The medium of claim 1, wherein the partially reflective layer has a thickness within the range of from about 42 to 64 nm.

4. The medium of claim 1, wherein the partially reflective layer has a thickness within the range of from about 130 to 160 nm.

5. The medium of claim 1, wherein the partially reflective layer has a thickness in the range of from about 140 to 160 nm.

6. An optical storage medium for storing information in at least two separate layers, the medium comprising, in order:
   a transparent substrate having a pattern of pits in one major surface thereof;
   a partially reflective layer, adjacent the substrate, comprising amorphous selenium;
   a transparent spacer layer; and
   a highly reflective layer;
wherein the medium is designed for use with a focused laser beam positioned to enter the medium through the substrate wherein the beam may be adjusted to be focused on each of the partially reflective layer and the highly reflective layer, and wherein the partially reflective layer has a thickness within ±10% of $3\lambda_1/4n_{\lambda,1}$ where $3\lambda_1/4n_{\lambda,1}=\lambda_2/2n_{\lambda,2}$, where the medium is designed for use with two substrate incident beams, $\lambda_1$, and $\lambda_2$, where $\lambda_2>\lambda_1$, and the partially reflective layer has an index of refraction having a real component (n) having a value measured at $\lambda_1$ of $n_{\lambda,1}$ and a value measured at $\lambda_2$ of $n_{\lambda,2}$.

7. The medium of claim 1, wherein the partially reflective layer is adjacent the pit pattern.

8. The medium of claim 1, wherein the amorphous selenium is deposited via sputtering.

9. The medium of claim 7, further comprising a second pattern of pits provided in a major surface of the spacer layer adjacent the highly reflective layer.

10. The medium of claim 1, wherein the partially reflecting layer consists essentially of a-Se.

11. A dual layer pre-recorded optical storage disc, comprising, in order:
   a transparent substrate having a first data pit pattern in one major surface thereof,
   a partially reflective layer comprising amorphous selenium, adjacent the first data pit pattern, having an index of refraction having a real component, n, and an imaginary component, K, wherein n>2.6 and K<0.035 at 650 nm;
   a transparent spacer layer;
   a second data pit pattern; and
   a highly reflective layer provided adjacent the second data pit pattern.

12. The disc of claim 11, wherein K<0.01.

13. The disc of claim 11, wherein K<0.003 at 780 nm.

14. The disc of claim 11, wherein n>2.8 and K<0.01.

15. The disc of claim 11, wherein n>2.8 and K<0.003 at 780 nm.

16. The disc of claim 11, where the partially reflective layer has a thickness within the range from 38 to 69 nm.

17. The disc of claim 11, where the partially reflective layer has a thickness within the range from 42 to 64 nm.

18. The disc of claim 11, wherein the substrate has a thickness of about 0.6 mm, and wherein a substrate-incident light beam having a wavelength of 780 nm is reflected at the highly reflective layer at a reflectance, $R_1$, where $R_1>0.7$, and wherein a substrate-incident light beam having a wavelength of 650 nm is reflected at the partially reflective layer at a reflectance, $R_2$, where $0.2<R_2<0.4$.

19. The disc of claim 18, wherein the partially reflective layer has a thickness within the range from 130 to 160 nm.

20. The disc of claim 11, wherein the first data pit pattern contains a format designed for use with a first disc drive having a first laser beam having a first wavelength, $\lambda_1$, and wherein the second data pit pattern contains a second different format designed for use with a second different disc drive having a second different laser beam having a second different wavelength, $\lambda_2$, wherein $\lambda_2>\lambda_1$.

21. The disc of claim 20, wherein the substrate has a thickness of about 0.6 mm and the entire disc has a thickness of about 1.2 mm.

22. The disc of claim 11, wherein the transparent spacer layer has a thickness of 5 to 100 μm.

23. An optical storage system, comprising:
   an optical storage medium, comprising, in order:
      a transparent substrate having a pattern of pits in one major surface thereof;
      a partially reflective layer comprising amorphous selenium and having an index of refraction having a real component, n, wherein n>2.6, and an imaginary component, K, less than 0.035 at 650 nm;
      a transparent polymer spacer layer; and
      a highly reflective layer;
   a focused laser beam positioned to enter the medium through the substrate;
   means for adjusting focal position of the laser beam, whereby the beam may be focused on either the partially reflective layer or the highly reflective layer; and
   a photodetector positioned to detect the reflected laser beam exiting the medium.

24. A pre-recorded dual layer optical disc storage system, comprising:
   a dual layer pre-recorded optical disc, comprising, in order;
      a transparent substrate having a first data pit pattern in one major surface thereof;
      a partially reflective layer comprising amorphous selenium, adjacent the first data pit pattern, having an index of refraction having a real component, n, wherein n >2.6, and an imaginary component, K, less than 0.035 at 650nm;
      a transparent spacer layer having a second data pit pattern in one major surface thereof, said major surface being on a side of the spacer layer opposite the substrate; and
      a highly reflective layer provided adjacent the second data pit pattern;
   a focused laser beam positioned to enter the disc through the substrate;
   means for adjusting focal position of the laser beam, whereby the beam may be focused on either the partially reflective layer or the highly reflective layer; and
   a photodetector positioned to detect the reflected laser beam exiting the disc.

25. The system of claim 24, wherein the substrate has a thickness of about 0.6 mm, and wherein a substrate-incident light beam having a wavelength of 780 nm is reflected at the highly reflective layer at a reflectance, $R_1$, where $R_1>0.7$, and wherein a substrate-incident light beam having a wavelength of 650 nm is reflected at the partially reflective layer at a reflectance, $R_2$, where $0.2<R_2<0.4$.

26. The system of claim 24, wherein the focused laser beam has a wavelength of 780 nm and is reflected at the highly reflective layer at a reflectance, $R_1$, >0.7.

27. The system of claim 24, wherein the focused laser beam has a wavelength of 650 nm and is reflected at the partially reflected layer at a reflectance, $R_2$, wherein $0.2<R_2<0.4$.

28. The system of claim 24, wherein the transparent spacer layer has a thickness of 5 to 100 μm.

29. An optical storage medium for storing information in at least two separate layers, the medium comprising, in order:

a transparent substrate having a pattern of pits in one major surface thereof;

a partially reflective layer, adjacent the substrate, comprising amorphous selenium and having a thickness within the range of from about 130 to 160 nm;

a transparent spacer layer; and a highly reflective layer;

wherein the medium is designed for use with a focused laser beam positioned to enter the medium through the substrate, wherein the beam may be adjusted to be focused on each of the partially reflective layer and the highly reflective layer.

30. The medium of claim 29, wherein the partially reflective layer has a thickness within the range of from about 140 to 160 nm.

* * * * *